(12) United States Patent
Takahashi et al.

(10) Patent No.: US 7,279,861 B2
(45) Date of Patent: Oct. 9, 2007

(54) SERVO CONTROL APPARATUS

(75) Inventors: Shoetsu Takahashi, Fukuoka (JP); Sumitoshi Sonoda, Fukuoka (JP)

(73) Assignee: Kabushiki Kaisha Yasakawa Denki, Fukuoka (JP)

( * ) Notice: Subject to any disclaimer, the term of this patent is extended or adjusted under 35 U.S.C. 154(b) by 30 days.

(21) Appl. No.: 11/338,787

(22) Filed: Jan. 25, 2006

(65) Prior Publication Data

US 2006/0198068 A1    Sep. 7, 2006

(30) Foreign Application Priority Data

Jan. 26, 2005    (JP)    ............ P. 2005-018585

(51) Int. Cl.
H02P 5/74      (2006.01)
H02P 3/18      (2006.01)
H02P 27/06     (2006.01)
H02H 9/08      (2006.01)

(52) U.S. Cl. ............... 318/563; 318/568.16; 318/473; 318/800; 361/42; 361/118

(58) Field of Classification Search ............... 318/473, 318/563, 568.16, 778, 800; 361/42, 118
See application file for complete search history.

(56) References Cited

U.S. PATENT DOCUMENTS

| | | | | |
|---|---|---|---|---|
| 4,434,390 A | * | 2/1984 | Elms ..................... | 318/473 |
| 4,453,117 A | * | 6/1984 | Elms et al. ............. | 318/778 |
| 4,456,867 A | * | 6/1984 | Mallick et al. .......... | 318/778 |
| 4,467,260 A | * | 8/1984 | Mallick et al. .......... | 318/800 |
| 4,747,061 A | * | 5/1988 | Lagree et al. ........... | 700/298 |
| 5,483,167 A | * | 1/1996 | Mikami .................. | 324/510 |
| 6,320,769 B2 | * | 11/2001 | Kurokami et al. ...... | 363/56.03 |
| 6,856,137 B2 | * | 2/2005 | Roden et al. ........... | 324/509 |
| 6,856,497 B2 | * | 2/2005 | Suzui et al. ............. | 361/42 |
| 6,927,965 B2 | * | 8/2005 | Atmur .................... | 361/118 |
| 7,079,406 B2 | * | 7/2006 | Kurokami et al. ...... | 363/56.03 |
| 2003/0067723 A1 | * | 4/2003 | Suzui et al. ............. | 361/42 |
| 2005/0099743 A1 | * | 5/2005 | Lee ........................ | 361/42 |

FOREIGN PATENT DOCUMENTS

JP    5-328739 A    12/1993

* cited by examiner

*Primary Examiner*—Paul Ip
(74) *Attorney, Agent, or Firm*—Sughrue Mion Pllc.

(57) ABSTRACT

In a servo control apparatus constituted by a converter unit 3 for rectifying an AC power supply voltage to produce a DC power supply voltage, and a plurality of inverter units 5 for producing drive power supply voltages of motors from the DC power supply voltage, the servo control apparatus is provided with a power supply breaker 2 which is connected to the side of the AC power supply of the converter unit 3; and a ground fault detecting circuit 16 built in the converter unit 3. When a ground fault happens to occur, the servo control apparatus stops the operations of all of the inverter units 5 so as to cut off the breaker 2.

5 Claims, 4 Drawing Sheets

SERVO CONTROL APPARATUS

BACKGROUND OF THE INVENTION

The present invention is related to a servo control apparatus which is constituted in a multiple shaft manner by a converter unit and a plurality of inverter units.

As conventional techniques for detecting ground faults, for example, a patent publication 1 is opened. The conventional techniques will now be explained with reference to drawings. FIG. 2 is a block diagram for showing an arrangement of one conventional technique. In FIG. 2, reference numeral 101 indicates an AC power supply which is grounded, and reference numeral 102 shows an AC/DC converting circuit (rectifying circuit and converter) which is arranged by a diode bridge and a smoothing capacitor CB. Reference numeral 103 indicates a DC/AC converting circuit (inverter) in which a bridge circuit is arranged by employing respective arms (namely, in U phase, V phase, W phase, X phase, Y phase, and Z phase) of transistors and diodes. The DC/AC converting circuit 103 outputs 3-phase AC power having an output frequency and an output voltage in correspondence with a frequency command. The output of the DC/AC converting circuit 103 is connected to an induction motor 104, so that the induction motor 104 is driven in a variable speed. A load current of the Z phase of this induction motor 104 is detected by a current detector 105, and then, an output signal of the current detector 105 constitutes a signal "i" which is directly in proportional to the load current. This current "i" is continuously compared with each other by an overcurrent detecting circuit 106 so as to perform an overcurrent protection. That is, in the overcurrent protection, when the overcurrent is detected by the overcurrent detecting circuit 106, the operation of the DC/AC converting circuit 103 is stopped. Further, the current "i" is inputted to a comparator 111 of a ground fault detecting circuit 109. In the comparator 111, the signal "i" is compared with a reference value vs2, and when the signal "i" exceeds the reference value vs2, the comparator 111 outputs such a signal of an output "1." A drive control circuit 108 outputs a signal "b" to a base drive circuit 107 during a normal operation. This signal "b" turns ON/OFF the transistors of the respective arms as to the U, V, W, X, Y, and Z phases. When the above-explained signal "b" is not outputted, the drive control circuit 108 further outputs aground fault detecting instruction signal "a" in response to a necessity of investigating a ground fault condition. When the signal "a" is inputted to a ground fault detecting-purpose base driving circuit 110, this ground fault detecting-purpose base driving circuit 110 outputs a drive signal with respect to the transistor of the Z phase for a predetermined time period. At this time, when a ground fault happens to occur in the output, as indicated in FIG. 2, a ground fault current "IG" flows through the transistor of the Z phase. At this time, the current detector 105 apparently detects a current "iG" of the Z phase to produce a signal "i." The comparator 111 compares this signal "i" with the reference value vs2, and outputs a signal "c" of an output "1" when this signal "i" exceeds the reference value vs2. The signal "a" is entered to one input terminal of an AND circuit 113, and the above-explained signal "c" is entered from the comparator 111 to the other input terminal of the AND circuit 13. When both the signal "a" and the signal "c" are "1", the AND circuit 113 outputs a signal "d" of an output "1." The output signal "d" of the AND circuit 113 is inputted to a latch circuit 114 so as to be latched by the latch circuit 114. An output signal "g" of this latch circuit 114 prohibits the operation of the base drive circuit 107, and furthermore, is outputted to a display device 112, so that the display device 112 displays an occurrence of the ground fault and produces an alarm. Also, in addition, this output signal "g" of the latch circuit 114 is outputted as a ground fault detection signal to an external unit.

Also, another conventional technique is shown in FIG. 3. FIG. 3 is such an example that a servo control apparatus of multiple shafts such as a robot is constructed. In an application example to a robot, motors are built in the robot, and the servo control apparatus is connected to a robot control apparatus. Wiring lines wired to the motors are penetrated through the robot, and are moved in response to operations of the robot. originally, cables having anti-bending characteristics are used as these wiring lines. However, in connection with such a fact that action ranges of the robot are expanded, the bending ratio of the cables is increased. As a result, there is such an actual fact that occurring ratios of mechanical wearing of the cables and of disconnections of the cables become very high, as compared with those of other systems. In robot systems, ground fault detecting functions are necessary required. In FIG. 3, reference numeral 1 shows a power supply, reference numeral 2 indicates a breaker, reference numeral 3 represents a converter unit, reference numeral 4 shows a servo control circuit, and reference numeral 5 shows an inverter unit. Also, reference numeral 6 denotes a ground fault detecting circuit, reference numeral 7 shows a current detector, and reference numeral 8 denotes a motor. Since the current detector 7 is inserted in the output of the inverter unit 5, a zero-phase-sequence current is detected. As a method of detecting a zero-phase-sequence current, a sum of currents which flow through wired lines is detected. If no ground fault occurs, then the sum of currents becomes zero. When the ground fault is detected by the ground fault detecting circuit 6, the ground fault detecting circuit 6 outputs a ground fault signal to the servo-control circuit 4, and thus, the servo control circuit 4 is designed to turn OFF a power element of the inverter unit 5 and the breaker 2.

[Patent Document 1]
JP-A-5-328739 (FIG. 1)

However, in the conventional technique, since the zero-phase-sequence current detectors are used in the outputs of the inverter unit, plural sets of these zero-phase-sequence detectors and plural sets of ground fault current detecting circuits are required, the total quantities of which are equal to a total number of the shafts. Also, in order to turn OFF the breaker, the ground fault signals derived from the respective shafts must be received. As a result, plural sets of the wiring lines are required for the total quantity of these shafts. Among current servo control systems for robots, in particular, a strong demand as to compact sizes is made, and volumes occupied by servo control apparatus may become a problem and higher cost is required.

SUMMARY OF THE INVENTION

The present invention is made to solve such a problem, and therefore, has an object to provide a servo control apparatus equipped with a ground fault detecting function, and manufactured in a compact size and in low cost.

To solve the above-explained problem, a servo control apparatus of the present invention is arranged as follows:

According to the aspect 1, there is provided with a servo control apparatus including: a converter unit for rectifying an AC power supply voltage to produce a DC power supply voltage, a plurality of inverter units for producing driving power supply voltages of servo motors from the DC power supply voltage, and for driving the servo motors which are mutually coupled to each other, a breaker connected to the AC power supply side of the converter unit, and a ground fault detecting circuit built in the converter unit, wherein when the ground fault detecting circuit detects a ground fault, the servo control apparatus stops operations of all of the inverter units and cuts off the breaker.

According to the aspect 2, there is provided with the servo control apparatus as in the aspect 1, wherein the ground fault detecting circuit is connected on the side of the AC power supply of the converter unit.

According to the aspect 3, there is provided with the servo control apparatus as in the aspect 1, wherein the ground fault detecting circuit is connected on the side of the DC power supply of the converter unit.

According to the aspect 4, there is provided with the servo control apparatus as in the aspect 1, wherein the breaker is a contactor.

According to the aspect 5, there is provided with the servo control apparatus as in the aspect 1, wherein the ground fault detecting circuit is a zero-phase-sequence current detector.

In accordance with the present invention, the compact servo control apparatus equipped with the ground fault detecting function and manufactured in low cost can be provided.

DETAILED DESCRIPTION OF THE PREFERRED EMBODIMENTS

Referring now to drawings, various embodiments of the present invention will be described in detail.

Figure 1:
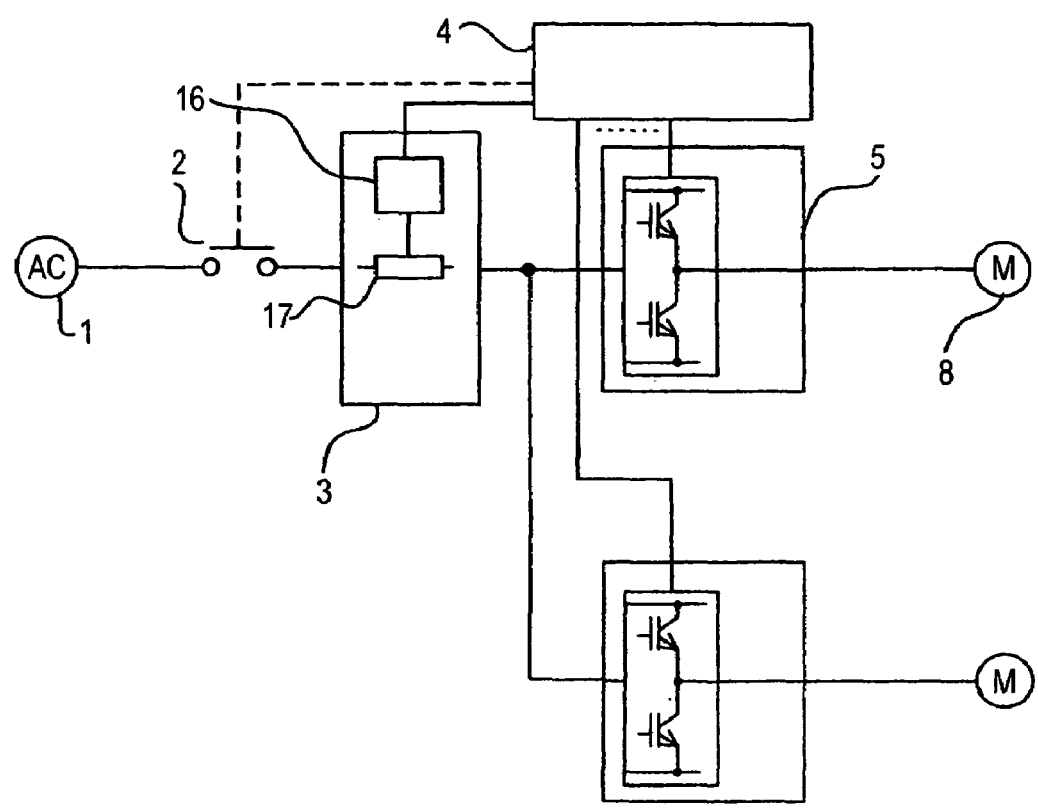
FIG. 1 is a block diagram for indicating an arrangement of a servo control apparatus of the present invention.
Figure 2:
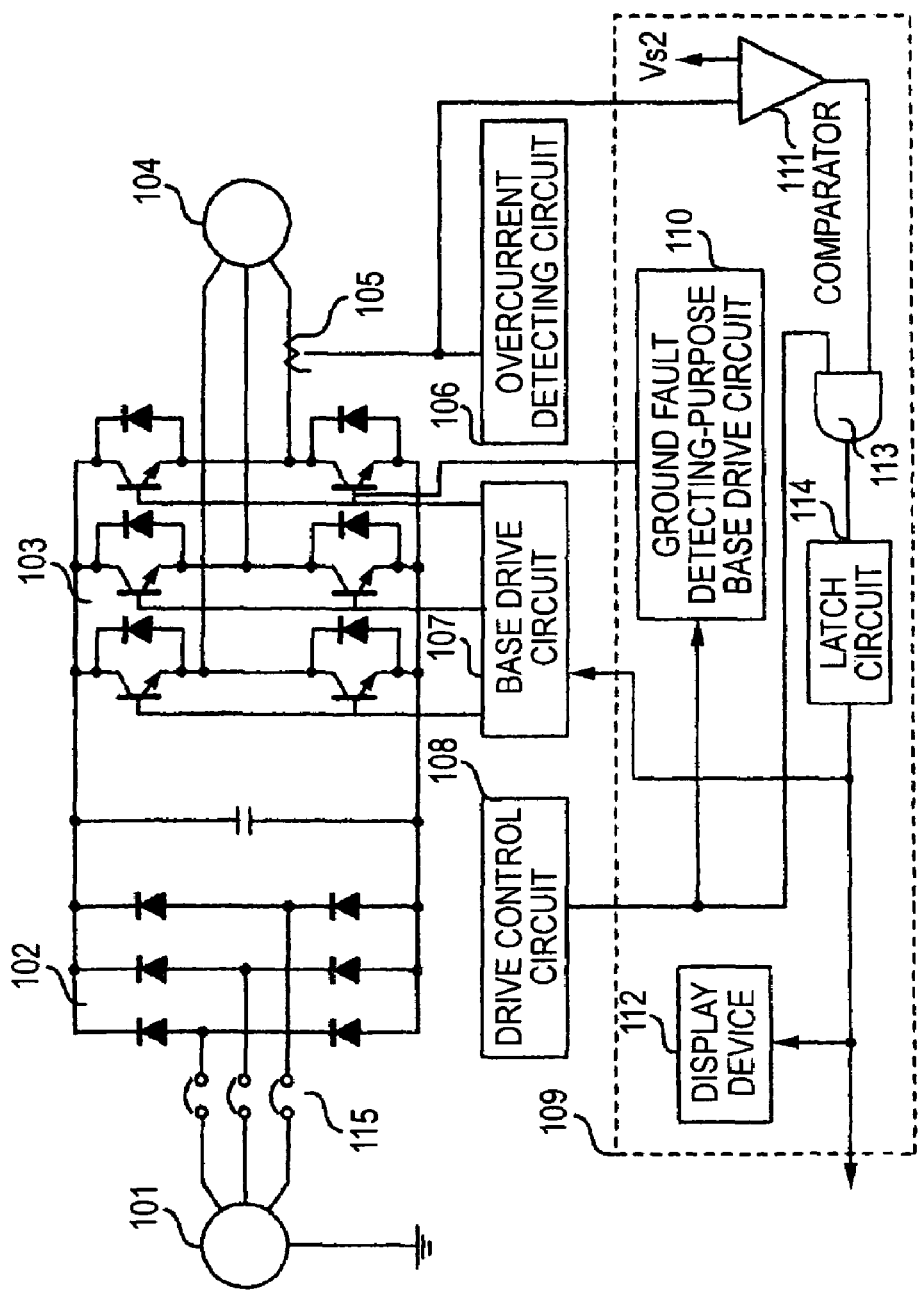
FIG. 2 is a block diagram for showing the arrangement of the inverter having the conventional ground fault protection function.
Figure 3:
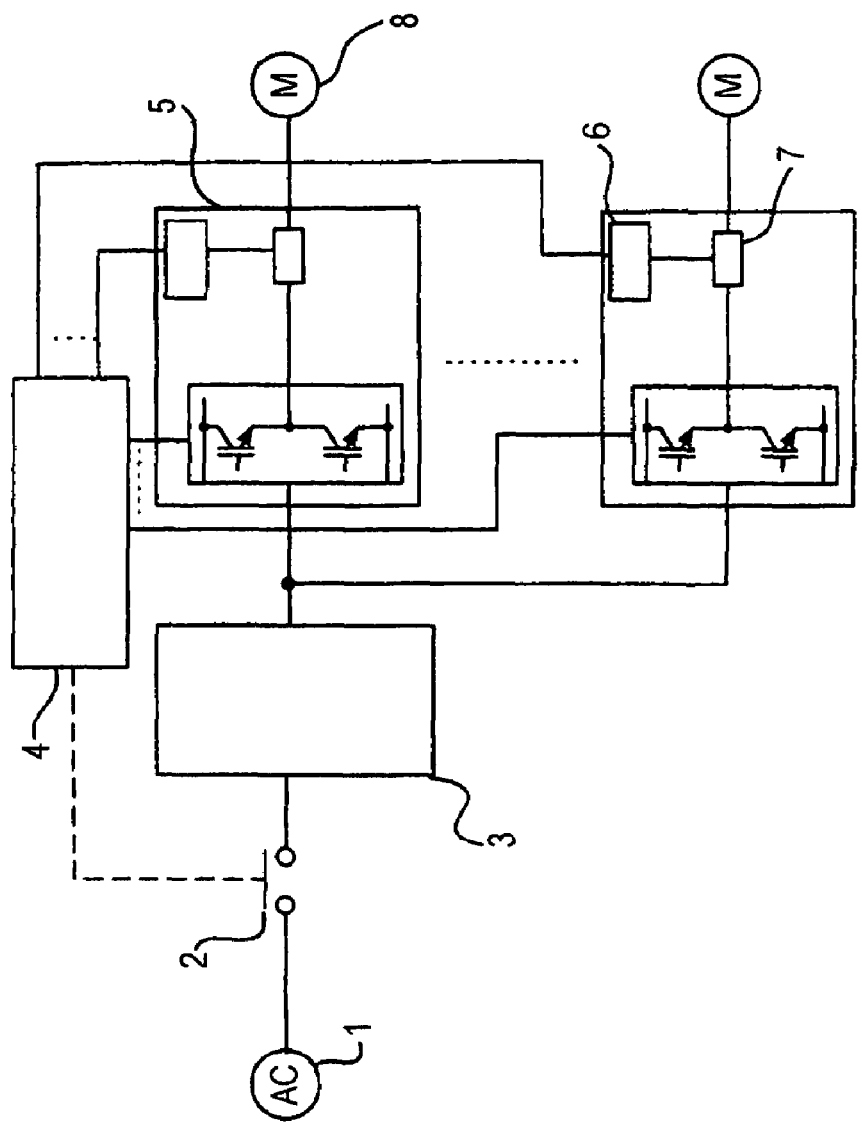
FIG. 3 is a block diagram for showing the arrangement of the multi-shaft servo control apparatus having the conventional ground fault protection function.

FIG. 1 is a block diagram for showing a robot-purpose servo control apparatus of the present invention. In this drawing, reference numeral 1 shows a power supply, reference numeral 2 indicates a breaker, reference numeral 3 represents a converter unit, reference numeral 4 shows a servo control circuit, and reference numeral 5 shows an inverter unit. Also, reference numeral 8 denotes a motor, and reference numeral 16 represents a ground fault detecting circuit. Only one set of the ground fault detecting circuit 16 is employed irrespective of a total shaft number of motors. In the case of a general-purpose servo system, a merit obtained by detecting a problem with respect to each of plural shafts is given as follows: That is, since only such a servo that a problem has occurred is cut off and other motors are driven, the entire servo system may be operated in some cases. However, in the case of a robot system, and the like, respective shafts of the robot system are mutually coupled to each other. As a result, there is no merit if only one shaft is stopped, conversely speaking, there is a risk when only one shaft is stopped. As a consequence, when the ground fault detecting circuit 16 detects a ground fault in the robot-purpose servo control apparatus, bases of major circuit transistors employed in all of the inverter units 5 are electrically blocked so as to stop the inverting operations of these inverter circuits 5, and thus, the servo control apparatus is cut off from the AC power supply by the breaker 2.

Embodiment 1

Figure 4:
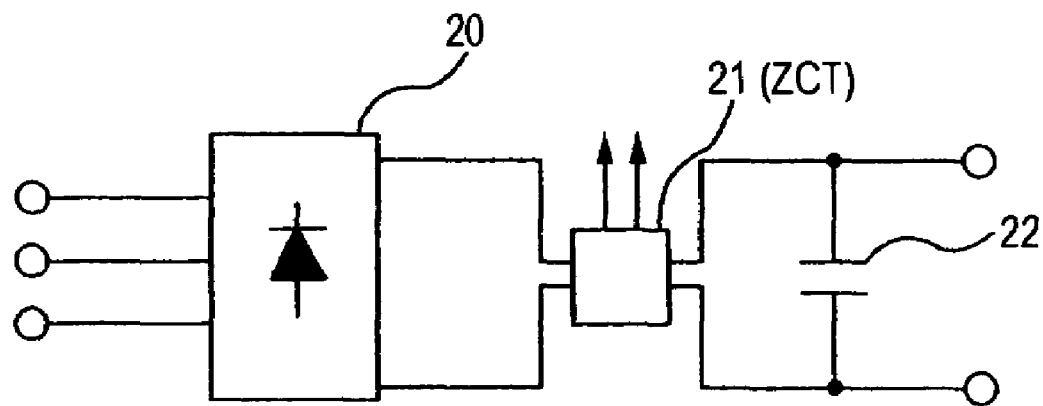
FIG. 4 is a block diagram for indicating a first embodiment of the present invention.

FIG. 4 is an example in which a zero-phase-sequence current detector is provided on the side of a DC power supply of a converter. A merit obtained by providing such a zero-phase-sequence current detector on the side of the DC power supply is given as follows: That is, in the case that a zero-phase-sequence current transformer is employed as the zero-phase-sequence current detector, two lines of a plus side and a minus side are linked irrespective of a total number of phases. As a result, the zero-phase-sequence current transformer can be made compact, and a total number of wiring lines can be reduced.

Embodiment 2

Figure 5:
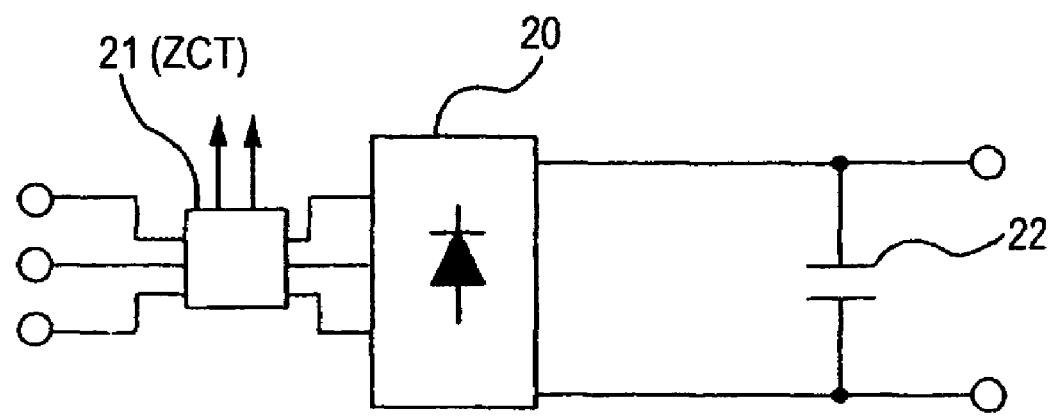
FIG. 5 is a block diagram for indicating a second embodiment of the present invention.

FIG. 5 is an example in which a zero-phase-sequence current detector is provided on the side of an AC power supply of a converter unit. A merit achieved by providing such a zero-phase-sequence current detector on the side of the AC power supply is given as follows: That is, a range of circuit portions to be detected becomes wide. For example, in the case that the zero-phase-sequence current detector is provided on the side of the DC current power supply, when a ground fault happens to occur in a rectifying diode of the converter unit, this ground fault cannot be detected. However, generally speaking, there is a rare case that a ground fault happens to occur in a stationary unit, and therefore, even when the ground fault detecting circuit is provided on any side of the AC power supply and the DC power supply, there is no large difference.

Since the servo control apparatus of the present invention can have the ground fault detecting function and can be realized in the compact size and the low cost, it is possible to expect that the servo control apparatus may be applied not only to robots, but also to general-purpose industrial machines which use motors having multiple shafts.

What is claimed is:

1. A servo control apparatus comprising:
  a converter unit for rectifying an AC power supply voltage to produce a DC power supply voltage,
  a plurality of inverter units for producing driving power supply voltages of servomotors from the DC power supply voltage, and for driving the servo motors which are mutually coupled to each other,
  a breaker connected to the AC power supply side of the converter unit, and
  a ground fault detecting circuit built in the converter unit, wherein
  when the ground fault detecting circuit detects a ground fault, the servo control apparatus stops operations of all of the inverter units and cuts off the breaker.

2. The servo control apparatus as claimed in claim 1, wherein
  the ground fault detecting circuit is connected on the side of the AC power supply of the converter unit.

3. The servo control apparatus as claimed in claim 1, wherein
  the ground fault detecting circuit is connected on the side of the DC power supply of the converter unit.

4. The servo control apparatus as claimed in claim 1, wherein
  the breaker is a contactor.

5. The servo control apparatus as claimed in claim 1, wherein
  the ground fault detecting circuit is a zero-phase-sequence current detector.

* * * * *